United States Patent Office 3,009,923
Patented Nov. 21, 1961

3,009,923
PROCESS FOR THE PREPARATION OF α-L-GLUTAMYL-CHOLINE AND ITS SALTS
Gaston Amiard, Noisy-le-Sec, and Rene Heymes, Romainville, France, assignors to UCLAF, Paris, France, a corporation of France
No Drawing. Filed Nov. 20, 1959, Ser. No. 854,245
Claims priority, application France Dec. 15, 1958
12 Claims. (Cl. 260—389)

The present invention is directed to a process for the preparation of α-L-glutamyl-choline and its salts substantially free of its γ-isomer. U.S. Patent No. 2,776,923 describes a process for the preparation of L-glutamyl-choline and its hydrochloride by the reaction of N-carbobenzoxy-L-glutamic acid anhydride with choline or the hydrochloride of choline. A mixture of the α- and γ-isomers of N-carbobenzoxylated L-glutamyl-choline or its hydrochloride is obtained thereby. Hydrogenation in the presence of platinum or palladium yields a mixture of the α- and γ-isomers of L-glutamyl-choline or its hydrochloride.

A process which makes it possible to obtain preferentially the α-isomer of L-glutamyl-choline and its salts substantially free of its γ-isomer has heretofore not been known, and it is an object of the present invention to remedy this deficiency.

Another object of this invention is the obtention of the non-toxic nitrate and iodide of α-L-glutamyl-choline substantially free of their γ-isomers.

A further object of this invention is the isolation of various intermediate compounds useful in preparing α-L-glutamyl-choline salts.

These and further objects of the invention will become more apparent as the description of the invention proceeds.

We have discovered that α-L-glutamyl-choline salts substantially free of their γ-isomers can be prepared by the following process. Glycol-monochlorohydrin is reacted at elevated temperatures with L-glutamic acid in the presence of gaseous hydrochloric acid, the hydrochloride of di-(β'-chloroethyl) L-glutamate is isolated. This hydrochloride is treated with an appropriate strong organic or inorganic base, such as triethylamine or an alkali metal hydroxide, preferably sodium hydroxide, to obtain the free di-(β'-chloroethyl) L-glutamate. The free amine is tritylated, preferably by reacting with trityl chloride in the presence of a tertiary amine, such as triethylamine and the di-(β'-chloroethyl) N-trityl-L-glutamate is isolated. This compound is dissolved in methanol and reacted with sodium methylate to give a methanolysis of the γ-carboxyl group. The α-(β'-chloroethyl)-γ-methyl ester of N-trityl-L-glutamic acid is isolated. This mixed ester is dissolved in an inert organic solvent and partially saponified with an alkali metal hydroxide such as sodium hydroxide in dioxan solution. The α-(β'-chloroethyl) N-trityl-L-glutamate ester is isolated either in the form of an amine salt of its acid, such as the diethylamine salt, or in the form of the free acid. The free acid is treated with an alkali metal iodide such as sodium iodide and trimethylamine in an anhydrous organic solvent such as acetone in a closed vessel at elevated temperatures. The choline derivative is then detritylated preferably by treating with an aqueous lower alkanoic acid such as 50% aqueous acetic acid and the iodide of α-L-glutamyl-choline is isolated. The iodide is transformed into the nitrate by the action of silver-nitrate in aqueous solution on the iodide of α-L-glutamyl-choline. Other salts can be produced by reaction with an appropriate reactant.

The series of reactions described above are shown in the following table:

TABLE

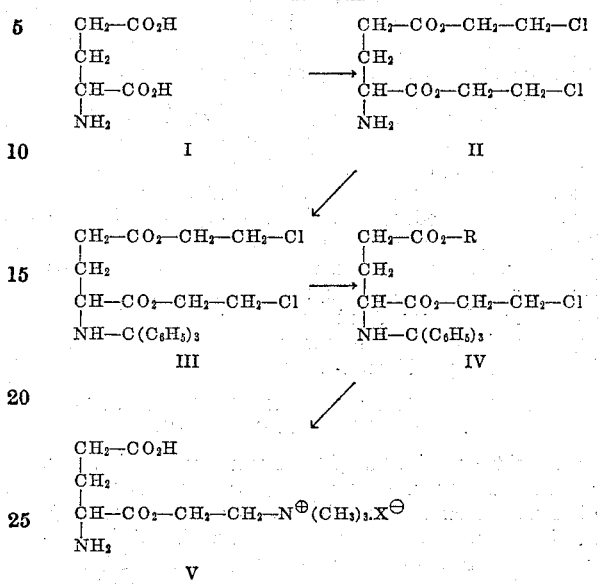

X=a non-toxic anion

As indicated in U.S. Patent 2,776,923, L-glutamyl-choline and its salts are products exhibiting an interesting pharmacodynamic activity; they have been recommended for use in the treatment of poliomyelitis and hypertension and as growth promoting agents.

According to Yoshito Nishizawa, Archives Francaises de Pediatric, 15, 195–216 (1958), α-L-glutamyl-choline has twice the therapeutic activity of γ-L-glutamyl-choline.

The following examples illustrate the invention. It is to be understood, however, that the invention is not limited to the examples and such changes and modifications as occur to one skilled in the art are contemplated in the practice of the invention.

Example 1.—Preparation of the hydrochloride of di-(β'-chloroethyl) L-glutamate (II)

20 gm. of L-glutamic acid (I) are introduced into 200 cc. of glycol-monochlorohydrin, and the mixture is heated on an oil bath at 105±5° C., while agitating and passing gaseous hydrochloric acid therethrough until the mixture is saturated and completely dissolved. This requires approximately 30 minutes.

The solution is allowed to stand at the same temperature for 3 hours more and then distilled on a water bath under reduced pressure until about 150 cc. of glycol-monochlorohydrin pass over, 250 cc. of ether are added to the residue, the mixture is iced and filtered on a vacuum filter. The filter cake is washed with ether by trituration and dried at 50° C., yielding 39 gm. (93%) of the hydrochloride of di-(β'-chloroethyl) L-glutamate (II) having a melting point of 115 to 117° C, and an optical rotation $[\alpha]_D^{20} = +16° \pm 0.5$ (c.=2% in water). This product, which has not previously been described, is obtained in the form of colorless leaflets which are soluble in water and alcohol, slightly soluble in acetone and chloroform, and insoluble in ether.

Analysis.—$C_9H_{16}O_4NCl_3$; mol. wt. 308.6. Calculated: C, 35.02%; H, 5.22%; O, 20.73%; N, 4.54%; Cl, 34.47%. Found: C, 35.3%; H, 5.3%; O, 20.6%; N, 4.5%; Cl, 34.2%.

*Example II.—Preparation of α-(β'-chloroethyl)-γ-methyl N-trityl-L-glutamate (IV in which R=CH₃)*

(a) DI-(β'-CHLOROETHYL) L-GLUTAMATE 31 gm. of di-(β'-chloroethyl) L-glutamate hydrochloride, obtained in accordance with the preceding example, are introduced into 50 cc. of ice water; thereafter, 250 cc. of chloroform, 2 drops of phenolphthalein and then, in small portions, 12.5 cc. of concentrated sodium hydroxide solution are added. The chloroform phase is decanted, the aqueous solution is extracted with 25 cc. of chloroform, the chloroform solutions are combined, washed with 15 cc. of water and dried over magnesium sulfate.

(b) DI-(β'-CHLOROETHYL) N-TRITYL-L-GLUTAMATE (III)

30 gm. of trityl chloride are added to the chloroform solution obtained in (a) above, and thereafter 15 cc. of triethylamine are added in small portions. The mixture is allowed to stand overnight at 30° C. It is then washed with 50 cc. of water, with a mixture consisting of 50 cc. of water and 45 cc. of 1 N hydrochloric acid and, finally, with 40 cc. of water, dried over magnesium sulfate and evaporated in vacuo. The residue obtained is primarily di-(β'-chloroethyl) N-trityl-L-glutamate.

(c) α-(β'-CHLOROETHYL)-γ-METHYL N-TRITYL-L-GLUTAMATE (IV IN WHICH R=—CH₃)

The residue obtained in (b) above is dissolved in 50 cc. of methanol, evaporated to dryness in vacuo and taken up in 200 cc. of methanol at 35° C. 2.5 cc. of a 1 N solution of sodium methylate in methanol are added and the mixture is allowed to stand for 20 minutes at 35° C. 1 cc. more of the sodium methylate solution is added and after 40 minutes of standing, another 1 cc. is added. The mixture is allowed to stand at 35° C. for one hour and at room temperature for one hour. Thereafter, it is iced, filtered on a vacuum filter, the filter cake rinsed with iced methanol and dried at 40° C. 30 gm. of the raw product are obtained, this product is taken up in 50 cc. of carbon tetrachloride. The solution is iced and the insoluble matter is filtered off. The filtrate is concentrated to one-half its volume, 50 cc. of methanol are added and the remaining carbon tetrachloride is distilled off. The solution is iced, filtered on a vacuum filter, the filter cake is rinsed with iced methanol and dried at 40° C. 29.2 gm. (63%) of α-(β'-chloroethyl)-γ-methyl N-trityl-L-glutamate (IV in which R=—CH₃), having a melting point of 83–86° C. and an optical rotation $[\alpha]_D^{20} = +35.5° \pm 0.5$ (c.=2% in chloroform) are obtained.

*Analysis.*—$C_{27}H_{18}O_4NCl$; mol. wt. 465.95. Calculated: C, 69.59%; H, 6.05%; N, 3.0%; Cl, 7.61%. Found: C, 69.8%; H, 6.0%; N, 3.1%; Cl, 7.8%.

*Example III.—Preparation of α-(β'-chloroethyl) N-trityl-L-glutamate (IV in which R=—H)*

4.7 gm. of α-(β'-chloroethyl)-γ-methyl N-trityl-L-glutamate, obtained according to the preceding example are dissolved in 40 cc. of dioxan, and to this solution 10 cc. of methanol and 10.5 cc. of 1 N sodium hydroxide are added. The mixture is placed on an ice water bath and allowed to stand overnight while warming to room temperature.

The major portion of the solvents are evaporated in vacuo, 50 cc. of water are added and the distillation of the dioxan is completed. 40 cc. of chloroform is added to the aqueous solution and thereafter 11 cc. of 1 N hydrochloric acid are added. The mixture is agitated, then decanted, and extracted twice with 5 cc. portions of chloroform. The chloroform solutions are combined, washed with 10 cc. of water, dried over magnesium sulfate and evaporated to dryness in vacuo. α-(β'-chloroethyl) N-trityl-L-glutamate (IV in which R=—H) is obtained in a quantitative yield.

This substance, which is obtained in the form of an oil, has not previously been described; it may be used as such in Example V.

*Example IV.—Characterization of α-(β'-chloroethyl) N-trityl-L-glutamate (IV in which R=—H) in the form of its γ diethylamine salt*

The raw oil obtained in the preceding example is taken up in 10 cc. of ether. 1.1 cc. of diethylamine are added and then, in two portions, 20 cc. cyclohexane are added. The mixture is iced for 2 hours and filtered on a vacuum filter. The filter cake is washed with cyclohexane and dried. 4.7 gm. of the γ-diethylamine salt of α-(β'-chloroethyl) N-trityl-L-glutamate, having a melting point around 100° C. and an optical rotation $[\alpha]_D^{20} = +46° \pm$ (c.=2% in chloroform), are obtained. This product, which is novel, is obtained in the form of colorless small needles, which are soluble in water, alcohol, acetone, benzene and chloroform, and slightly soluble in ether and cyclohexane.

*Analysis.*—$C_{30}H_{37}O_4N_2Cl$; mol. wt. 525.077. Calculated: C, 68.62%; H, 7.1%; N, 5.33%; Cl, 6.75%. Found: C, 68.8%; H, 7.1%; N, 5.1%; Cl, 6.2%.

*Example V.—Preparation of the iodide of α-L-glutamyl-choline (V) in which X=I*

(a) α-(β'-CHLOROETHYL) N-TRITYL-L-GLUTAMATE (IV IN WHICH R=—H)

16.5 gm. of the γ-diethylamine salt of α-(β'-chloroethyl) N-trityl-L-glutamate are introduced into 100 cc. of chloroform, 20 cc. of water are added and then in small portions and while agitating, 30 cc. of 1 N hydrochloric acid are added. The aqueous phase is decanted and extracted with 20 cc. of chloroform. The chloroform extracts are combined, washed with 30 cc. of water, dried over magnesium sulfate and evaporated to dryness in vacuo.

(b) IODIDE OF THE α-CHOLINE-N-TRITYL-L-GLUTAMATE 6 gm. of molten sodium iodide and then a solution of the α-(β'-chloroethyl) N-trityl-L-glutamate obtained under (a) above in 20 cc. of dry acetone are introduced into a sealable tube. 12 cc. of anhydrous trimethylamine are added, the tube is sealed and the contents are heated overnight at 75° C. The tube is iced and opened, the contents are removed and evaporated to dryness in vacuo. The residue is taken up in 60 cc. of chloroform and the insoluble matter is filtered off. 20 cc. of water containing 1 cc. of acetic acid are added to the filtered solution. The solution is acidified to a pH of 2 with a dilute aqueous solution of hydroiodic acid. The aqueous phase is decanted and extracted with chloroform. The chloroform extracts are washed with 10 cc. of water and dried over magnesium sulfate. The extract is evaporated to dryness in vacuo. 120 cc. of anhydrous ether are added, the mixture is stirred, filtered and the filter cake is dried in vacuo. 10.7 gm. of a raw product are thus obtained. This product is pulverized and again treated with ether as previously described in order to obtain 9.8 gm. (54%) of the iodide of α-choline ester of N-trityl-L-glutamic acid.

(c) PREPARATION OF THE IODIDE OF α-L-GLUTAMYL-CHOLINE (V IN WHICH X=I)

7.2 cc. of a 50% aqueous solution of acetic acid are added to 3 gm. of the raw iodide of the α-choline ester of N-trityl-L-glutamic acid obtained in (b) above, the mixture is stirred and heated at 35° C. for 15 minutes. 18 cc. of acetone and then, in portions, 25 cc. of acetone are added. The mixture is filtered on a vacuum filter, the filter cake is washed with acetone and dried in vacuo to obtain 1.35 gm. (77%) of the iodide of α-L1glutamyl-choline, having a melting point of 170 to 180° C. and an optical rotation $[\alpha]_D^{20} = +13.5° \pm 1$ (c.=2% in water).

This product, which has not previously been described, is obtained in the form of small colorless needles which are soluble in water and insoluble in alcohol, ether, acetone and benzene.

*Analysis.*—$C_{10}H_{21}O_4N_2I$; mol. wt. 360.21. Calculated: C, 33.34%; H, 5.88%; N, 7.77%; I, 35.24%. Found: C, 33.3%, H, 5.8%; N, 7.7%; I, 36.0%.

*Example VI.—Preparation of the nitrate of α-L-glutamyl choline (V in which $X=NO_3$)*

1.08 gm. of the iodide of α-L-glutamyl choline obtained in accordance with the preceding example are introduced into a solution of 0.510 gm. of silver nitrate in 4 cc. of water. The mixture is filtered, concentrated to ½ its volume, 4 cc. of alcohol and 40 cc. of acetone are added, and the mixture is iced and filtered on a vacuum filter. The filter cake is recrystallized from 2 cc. of water containing a small amount of alcohol by addition of acetone in order to obtain 650 mgm. (75%) of the nitrate of α-L-glutamyl choline having a melting point of about 90° C. (in a capillary tube) and an optical rotation $[\alpha]_D^{20}=16.5°\pm1$ (c.=2% in water).

This product, which is new, is obtained in the form of small colorless leaflets which are soluble in water, slightly soluble in alcohol and insoluble in ether, acetone and benzene.

*Analysis.*—$C_{10}H_{21}O_7N_3$; mol. wt. 259.29. Calculated: C, 40.67%; H, 7.17%; N, 14.23%. Found: C, 40.6%, H, 7.2%; N, 13.9%.

It will be understood that the invention is not limited to the process described in the preceding examples nor to the products thus obtained. More particularly, the nature of the solvents and reactants, as well as the reaction temperatures may be varied without departing from the scope of the invention. It is readily apparent to those skilled in the art that various changes and modifications may be made without departing from the spirit of the invention or the scope of the appended claims.

We claim:

1. Non-toxic salts of α-L-glutamyl-choline substantially free of their γ-isomers selected from the group consisting of the iodide of α-L-glutamyl-choline and the nitrate of α-L-glutamyl-choline.

2. The iodide of α-L-glutamyl-choline substantially free of its γ-isomer.

3. The nitrate of α-L-glutamyl-choline substantially free of its γ-isomer.

4. α-(β′-Chloroethyl)-γ-methyl N-trityl-L-glutamate.

5. α-(β′-Chloroethyl) ester of N-trityl-L-glutamate.

6. The iodide of the α-choline ester of N-trityl-L-glutamic acid.

7. A process for the production of a non-toxic salt of α-L-glutamyl-choline substantially free of its γ-isomer comprising the steps of (a) esterifying L-glutamic acid with glycol-monochlorohydrin in the presence of gaseous hydrochloric acid at elevated temperatures, (b) neutralizing the hydrochloride of di-(β′-chloroethyl) L-glutamate by treatment with a strong base selected from the group consisting of triethylamine and alkali metal hydroxides, (c) reacting the di-(β′-chloroethyl) L-glutamate with trityl chloride in the presence of a tertiary amine, (d) dissolving the di-(β′-chloroethyl) N-trityl-L- glutamate in methanol and reacting with sodium methylate, (e) dissolving the α-(β′-chloroethyl)-γ-methyl N-trityl-L-glutamate in an inert organic solvent and saponifying with an alkali metal hydroxide, (f) quaternizing the α-(β′-chloroethyl) ester of N-trityl-L-glutamic acid by reacting with trimethylamine and an alkali metal iodide in an anhydrous organic solvent under pressure at elevated temperatures, (g) detritylating the iodide of the α-choline ester of N-trityl-L-glutamic acid by contacting with an aqueous lower alkanoic acid, (h) and isolating a non-toxic salt of α-L-glutamyl choline substantially free of its γ-isomer.

8. The process of claim 7 wherein the strong base used in the neutralizing step b is sodium hydroxide.

9. The process of claim 7 wherein the tertiary amine used in the reacting step c is triethylamine.

10. The process of claim 7 wherein the inert organic solvent and the alkali metal hydroxide used in the dissolving and saponifying step e are respectively dioxan and sodium hydroxide.

11. The process of claim 7 wherein the aqueous lower alkanoic acid used in the detritylating step g is a 50% aqueous solution of acetic acid.

12. A process for the production of a non-toxic salt of α-L-glutamyl-choline substantially free of its γ-isomer comprising the steps of (a) esterifying L-glutamic acid with glycol-monochlorohydrin in the presence of gaseous hydrochloric acid at a temperature between about 100° C. and 110° C., (b) neutralizing the hydrochloride of di-(β′-chloroethyl) L-glutamate by treatment with a solution of an alkali metal hydroxide, (c) reacting the di-(β′-chloroethyl) L-glutamate with trityl chloride in the presence of triethylamine, (d) dissolving the di-(β′-chloroethyl) N-trityl-L-glutamate in methanol and reacting with sodium methylate, (e) dissolving the α-(β′-chloroethyl)-γ-methyl N-trityl-L-glutamate in dioxan and saponifying with an alkali metal hydroxide, (f) quaternizing the α-(β′-chloroethyl) ester of N-trityl-L-glutamic acid by reacting with trimethylamine and an alkali metal iodide in acetone under pressure at a temperature between about room temperature and about 75° C., (g) detritylating the iodide of the α-choline ester of N-trityl-L-glutamic acid by contacting with an aqueous lower alkanoic acid, and (h) isolating a non-toxic salt of α-L-glutamyl choline substantially free of its γ-isomer.

References Cited in the file of this patent

UNITED STATES PATENTS 2,776,923    Nishizawa    Jan. 8, 1957

OTHER REFERENCES

R. B. Angier et al.: J. Org. Chem., volume 21 (1956), pages 1540–3.

UNITED STATES PATENT OFFICE
CERTIFICATE OF CORRECTION

Patent No. 3,009,923            November 21, 1961

Gaston Amiard et al.

It is hereby certified that error appears in the above numbered patent requiring correction and that the said Letters Patent should read as corrected below.

Column 3, line 3, after "CHLOROETHYL" insert a closing parenthesis; line 50, for "$C_{27}H_{18}O_4NCl$" read -- $C_{27}H_{28}O_4NCl$ --; column 4, line 69, for "α-L-lglutamyl-" read -- α-L-glutamyl- --; column 5, line 18, for "16.5°" read -- +16.5° --.

Signed and sealed this 8th day of May 1962.

(SEAL)
Attest:

ERNEST W. SWIDER
Attesting Officer

DAVID L. LADD
Commissioner of Patents